April 13, 1943. C. E. HEDRICK 2,316,426
SAFETY SANITARY GUARD FOR DRINKING TROUGHS OF POULTRY FOUNTAINS
Filed July 8, 1940

INVENTOR.
CLARENCE ELLIOTT HEDRICK
BY

Patented Apr. 13, 1943

2,316,426

UNITED STATES PATENT OFFICE 2,316,426

SAFETY SANITARY GUARD FOR DRINKING TROUGHS OF POULTRY FOUNTAINS

Clarence Elliott Hedrick, Newton, Kans.

Application July 8, 1940, Serial No. 344,398

2 Claims. (Cl. 119—77)

My invention relates to a safety sanitary guard for drinking troughs of poultry fountains, and has for its principal object to provide ample room for chicks to drink, and more particularly to prevent the chicks from entering the trough intentionally, or otherwise, and preserving them against a possibility of plunging into the water, whereby health and vigor are impaired.

A further object of my invention is to provide a guard for a poultry drinking trough that will function as separating or spacing means for the poultry to avoid congestion and interference with each other while drinking.

A still further object of this invention is to provide a guard to prevent coarse debris from entering the trough as thrown by the poultry scratching or otherwise.

A still further object of this invention is to provide a guard made of a strip of sheet metal, or wire screening, formed into a series of pleats to permit a longitudinal flex sideways of the guard, and also adapted to encircle a cylindrical tank to engage with an annular trough at the base of the tank; in case of the latter, the end pleats will interlap as securing means against retraction when the pleats are in contact with the inner wall of the trough.

A still further object of this invention is to construct a sanitary safety guard adaptable to tanks and troughs of standard makes of poultry drinking fountains, the said safety guard being inexpensive to construct and efficient in its performance.

These and other objects will hereinafter be more fully explained, reference being had to the accompanying drawing forming a part of this specification, and in which like characters will apply to like parts in the different views.

Referring to the drawing.

Figure 1:
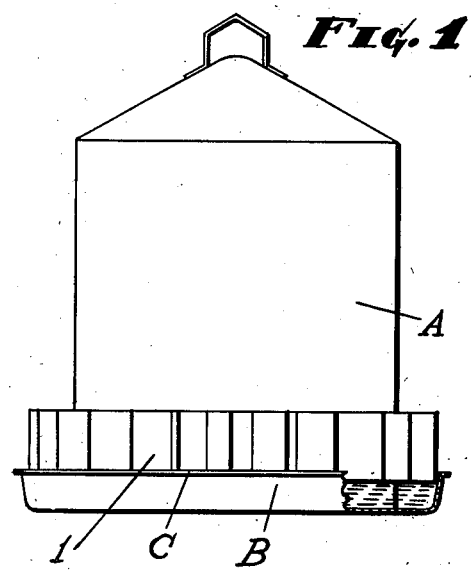
Fig. 1 is a side elevation of a conventional poultry drinking fountain to which my newly invented guard is applied.
Figure 2:
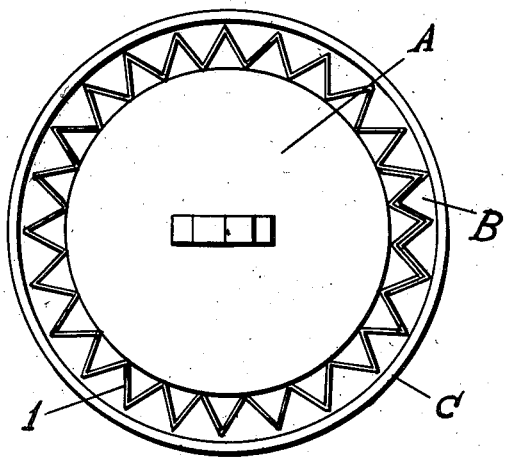
Fig. 2 is a plan view of Fig. 1.
Figure 5:
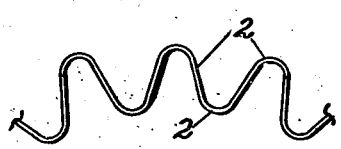
Fig. 5 is another modified form for the guard.
Figure 6:
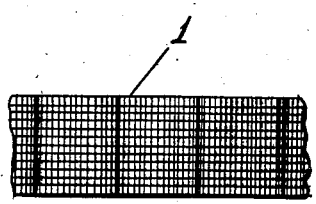
Fig. 6 is a modification for the guard substituting wire screening for sheet metal.

The invention herein disclosed consists of a guard comprised of a strip of sheet metal formed into a series of pleats 1 uniformly applied longitudinally of the strip, said pleats transversely crossing the strip as shown in Figs. 1 and 6 whereiin said guard is applied to a poultry drinking fountain comprising a tank A having an annular trough B outwardly extending from the wall of the tank. The outside wall of the trough slants outward and upward, and has a flange C horizontally disposed at its upper edge and upon which the outer extension of the pleats may seat, or expanding the guard longitudinally will permit said guard to rest upon the slanting trough wall as shown in Fig. 1. The guard being formed into a plurality of pleats as shown in Fig. 2, or corrugated as shown in Fig. 5, or partially corrugated as shown in Fig. 4, is means to subdivide the trough longitudinally thereof so that chicks may have their individual spaces from which to drink; furthermore the guard being so formed, is flexible longitudinally thereof whereby tension about the cylindrical tank will provide close engagement sufficient to avoid displacement under ordinary circumstances occurring in the poultry yard, and furthermore by expansion of the guard the pleats when interlapped to snug engagement will provide an efficient connection against retraction or displacement and especially it will be seen that a guard thus connected and positioned downward within the wall of the trough, as illustrated in Fig. 1, is an efficient means to bind the pleats to snug engagement.

Figure 3:
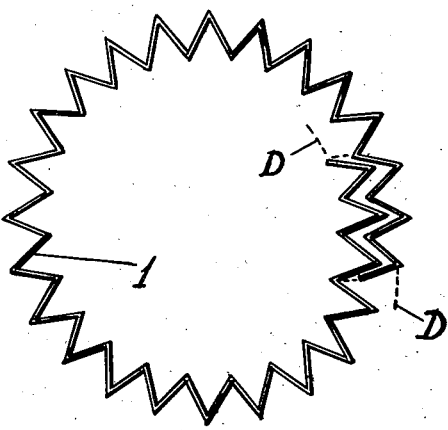
Fig. 3 is a plan view of the guard, showing the ends partially separated.

It will be seen in Fig. 3 that the guard may be varied in its circumference, step by step, by letting the ends of the guard lap more or less, with respect to the pleats, the movement to increase or decrease the diameter being directionally indicated by dotted lines D, and in said view the lapped portions are separated for convenience of illustration, and when said portions are snugly engaged and inserted within the trough between its wall and the wall of the tank said lapped portions will be retained to snug engagement with each other and against separation as heretofore stated. Being so arranged, the guard may be adjusted to tanks of different diameters, and it will also be understood that the meeting ends of the guard may be welded together, in which case, the flexibility will permit the guard to snugly engage on a tank that is greater in diameter than that of the guard normally. It is also possible to contract the guard longitudinally by bending the pleats a short distance toward each other for proper engagement with the trough.

Figure 4:
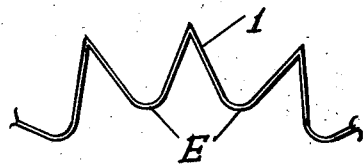
Fig. 4 is an enlarged plan view of a guard sector of modified form.

In Fig. 4 is illustrated that in lieu of the inner apices of the plates, corrugations E are provided, whereby the area between the pleats externally is increased to provide ample room for the heads of chicks at the time of drinking, while in Fig. 5, the apices externally and internally each are substituted by curvatures 2 whereby a pointed condition externally is eliminated, and especially at the upper extremity of the bend with which the chicks may contact.

The said guard is described as being formed from sheet metal and to such I do not wish to be restricted as wire screening as illustrated in Fig. 6 will function with equal efficiency, and such other modifications may be made as lie within the scope of the appended claims.

Having fully described my invention what I claim as new and desire to secure by Letters Patent is:

1. In combination with a drinking fountain comprising a vertically disposed cylindrical tank and an annular trough surrounding the said cylindrical tank at its lower extremity, the trough having an upwardly extending wall spaced outward from the tank, a strip of pleated material, the pleated strip being of sufficient length for lapped engagement of a portion of its pleated ends that coincide with respect to the abrupt bends of the pleats, said lapped portions being secured together when placed in the trough between its outer wall and the wall of the tank substantially as shown and described.

2. In combination with a cylindrical tank vertically disposed and an annular trough surrounding the tank, said trough consisting of a bottom and an outer wall, the wall extending upward and slanting outward, a plurality of integral solid vertical intersecting trough partitions surrounding the tank, the inner vertical edges being in contact with the tank, and the outer vertical edges at their lower ends being in contact with the slanting wall of the trough to prevent displacement of the partitions.

CLARENCE ELLIOTT HEDRICK.